(12) United States Patent
Hirooka

(10) Patent No.: US 7,848,870 B2
(45) Date of Patent: Dec. 7, 2010

(54) CONTROL APPARATUS AND CONTROL METHOD FOR NEGATIVE PRESSURE GENERATING APPARATUS

(75) Inventor: Shigemasa Hirooka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 323 days.

(21) Appl. No.: 12/149,083

(22) Filed: Apr. 25, 2008

(65) Prior Publication Data

US 2008/0267789 A1    Oct. 30, 2008

(30) Foreign Application Priority Data

Apr. 26, 2007    (JP) .............................. 2007-117638

(51) Int. Cl.
*B60T 7/12* (2006.01)
*F02M 1/00* (2006.01)

(52) U.S. Cl. ........................ 701/103; 123/445; 123/478

(58) Field of Classification Search ................. 701/103, 701/110, 112, 114, 115; 123/478, 480, 445, 123/446, 495

See application file for complete search history.

(56) References Cited

U.S. PATENT DOCUMENTS

| | | | |
|---|---|---|---|
| 7,650,221 B2 * | 1/2010 | Oi et al. ...................... | 701/103 |
| 2007/0234716 A1 * | 10/2007 | Hirooka ....................... | 60/397 |
| 2008/0264059 A1 * | 10/2008 | Hirooka ..................... | 60/547.1 |
| 2009/0132149 A1 * | 5/2009 | Hirooka ....................... | 701/103 |

FOREIGN PATENT DOCUMENTS

| | | |
|---|---|---|
| JP | A-2004-243837 | 9/2004 |
| JP | A-2004-285838 | 10/2004 |
| JP | A-2005-201196 | 7/2005 |
| JP | A-2005-297654 | 10/2005 |

\* cited by examiner

*Primary Examiner*—John T Kwon
(74) *Attorney, Agent, or Firm*—Oliff & Berridge, PLC

(57) ABSTRACT

A control apparatus for a negative pressure generating apparatus, includes an ejector that generates a negative pressure whose magnitude is larger than that of a negative pressure to be taken from an intake passage in an intake system for an internal combustion engine provided in a vehicle; a state change device that makes the ejector function or stop functioning; and a prohibition control device that prohibits the state change device from making the ejector function, when the vehicle is transiently decelerated.

9 Claims, 4 Drawing Sheets tion value in FIG. 4) when the opening degree of the throttle valve is smaller than the predetermined opening degree.
CONTROL APPARATUS AND CONTROL METHOD FOR NEGATIVE PRESSURE GENERATING APPARATUS

INCORPORATION BY REFERENCE

The disclosure of Japanese Patent Application No. 2007-117638 filed on Apr. 26, 2007 including the specification, drawings and abstract is incorporated herein by reference in its entirety.

BACKGROUND OF THE INVENTION

1. Field of the Invention

The invention relates to a control apparatus and a control method for a negative pressure generating apparatus. More specifically, the invention relates to a control apparatus and a control method for a negative pressure generating apparatus, which make an ejector function according to a magnitude of a negative pressure to be taken from an intake passage.

2. Description of the Related Art

In a vehicle, an ejector is used to supply a negative pressure whose magnitude is larger than that of a negative pressure to be taken from an intake passage (for example, an intake manifold or a surge tank) in an intake system for an internal combustion engine, to a negative pressure operating device such as a brake booster (hereinafter, the negative pressure to be taken from the intake passage may be referred to as "intake pipe negative pressure"). The ejector is described, for example, in Japanese Patent Application Publication No. 2005-297654 (JP-A-2005-297654).

The magnitude of the intake pipe negative pressure is generally largest when the internal combustion engine is idling. Therefore, the magnitude of the negative pressure in the negative pressure operating device is generally sufficiently large when the internal combustion engine is idling. When the ejector does not function, the intake pipe negative pressure is supplied to the negative pressure operating device. However, even when the internal combustion engine is idling, the magnitude of the intake pipe negative pressure varies under various conditions. That is, even when the internal combustion engine is idling, the magnitude of the intake pipe negative pressure may be small, and may not be sufficiently large for the negative pressure operating device.

In this case, by making the ejector function, the negative pressure, whose magnitude is larger than that of the intake pipe negative pressure, can be supplied to the negative pressure operating device. Therefore, it is preferable to make the ejector function, for example, when the intake pipe negative pressure is a negative value larger than a predetermined value. Further, it is possible to make the ejector function also when the internal combustion engine is idling, by executing a control that makes the ejector function when an opening degree of a throttle valve is smaller than a predetermined opening degree (i.e., the predetermined opening degree that is close to, and larger than an opening degree when the internal combustion engine is idling), to ensure that the magnitude of the negative pressure in the negative pressure operating device is sufficiently large when the internal combustion engine is idling.

However, when the ejector functions in the above-described manner, the following problem occurs. FIG. 4 is a diagram showing the intake pipe negative pressure, operation of the ejector in related art, and the opening degree of the throttle valve when the vehicle travels. In FIG. 4, when the intake pipe negative pressure is a negative value larger than the predetermined value as described above, and the opening degree of the throttle valve is smaller than the predetermined opening degree, the ejector functions.

As shown in FIG. 4, when the throttle valve is opened, the magnitude of the negative pressure is decreased, that is, the negative value indicating the negative pressure is increased. Then, when the throttle valve is closed after the vehicle is steadily accelerated, the magnitude of the intake pipe negative pressure is increased, that is, the negative value indicating the negative pressure is decreased. At this time, the vehicle is decelerated. However, the change in the intake pipe negative pressure lags behind the change in the opening degree of the throttle valve. Therefore, a situation occurs in which the intake pipe negative pressure is a negative value larger than the predetermined value (i.e., a negative pressure determination value in FIG. 4) when the opening degree of the throttle valve is smaller than the predetermined opening degree.

That is, in this situation, the intake pipe negative pressure is a negative value larger than the predetermined value, and the opening degree of the throttle valve is smaller than the predetermined opening degree. Accordingly, the ejector functions in this situation. However, immediately after that, the intake pipe negative pressure becomes a negative value equal to or smaller than the predetermined value, and therefore, the ejector stops functioning. That is, in this case, the ejector is momentarily operated, and immediately after that, the intake pipe negative pressure becomes a negative value equal to or smaller than the predetermined value (i.e., the ejector functions and stop functions). Thus, the ejector may be unnecessarily operated when the vehicle is transiently decelerated, and the change in the intake pipe negative pressure lags behind the change in the opening degree of the throttle valve.

SUMMARY OF THE INVENTION

The invention provides a control apparatus and a control method for a negative pressure generating apparatus, which prevent an ejector from being unnecessarily operated when a vehicle is decelerated.

A first aspect of the invention relates to a control apparatus for a negative pressure generating apparatus. The control apparatus includes an ejector that generates a negative pressure whose magnitude is larger than that of a negative pressure to be taken from an intake passage in an intake system for an internal combustion engine provided in a vehicle; a state change device that makes the ejector function or stop functioning; and a prohibition control device that prohibits the state change device from making the ejector function, when the vehicle is transiently decelerated.

With the above-described configuration, the ejector is prohibited from being operated when the vehicle is transiently decelerated. Therefore, it is possible to prevent the ejector from being unnecessarily operated when the vehicle is decelerated. This suppresses a decrease in durability of the state change device, and reduces the possibility that foreign matter enters the negative pressure generating apparatus. The ejector is generally provided in a bypass passage that bypasses a throttle valve. When the ejector functions, the amount of air taken into the internal combustion engine is increased by an amount of air flowing through the ejector. However, with the above-described configuration, it is possible to avoid a situation where the ejector is unnecessarily operated, and therefore, the amount of air taken into the internal combustion engine is changed, and thus, drivability of the vehicle is adversely affected.

A second aspect of the invention relates to a control method for a negative pressure generating apparatus that includes an ejector that generates a negative pressure whose magnitude is larger than that of a negative pressure to be taken from an intake passage in an intake system for an internal combustion engine provided in a vehicle; a state change device that makes the ejector function or stop functioning. The control method includes determining whether the vehicle is transiently decelerated; and prohibiting the state change device from making the ejector function, when it is determined that the vehicle is transiently decelerated.

According to the invention, it is possible to provide the control apparatus and the control method for the negative pressure generating apparatus, which prevent the ejector from being unnecessarily operated when the vehicle is decelerated.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

Hereinafter, an embodiment of the invention will be described in detail with reference to the drawings.

Figure 1:
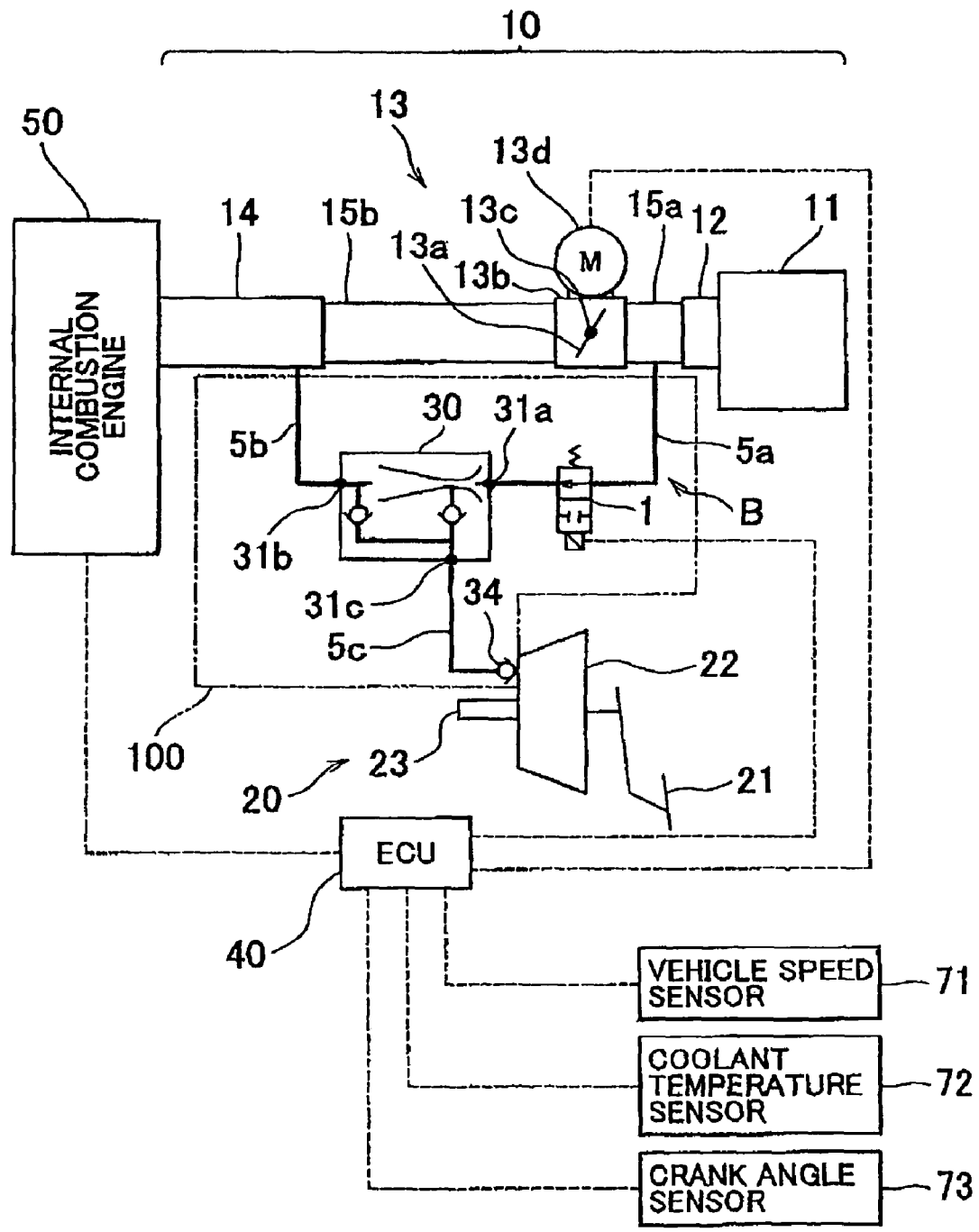
FIG. 1 is a schematic diagram showing a control apparatus for a negative pressure generating apparatus according an embodiment of the invention, along with the negative pressure generating apparatus.

FIG. 1 is a schematic diagram showing a control apparatus for a negative pressure generating apparatus according to an embodiment of the invention, along with a negative pressure generating apparatus 100. The control apparatus is implemented by an ECU (Electronic Control Unit) 40. Components shown in FIG. 1, which include an internal combustion engine 50, are provided in a vehicle (not shown). An intake system 10 for the internal combustion engine 50 includes an air cleaner 11, an airflow meter 12, an electric throttle 13, an intake manifold 14, intake ports (not shown) connected to cylinders (not shown) of the internal combustion engine 50, and members (for example, intake pipes 15a and 15b) that are appropriately provided among the components. The air cleaner 11 filters intake air supplied to the cylinders of the internal combustion engine 50. The atmospheric air flows into the air cleaner 11 through an air duct (not shown). The airflow meter 12 measures the amount of intake air (hereinafter, referred to as "intake air amount"), and outputs a signal corresponding to the intake air amount.

The electric throttle 13 includes a throttle valve 13a, a throttle body 13b, a valve shaft 13c, and an electric motor 13d. The intake air amount supplied to the internal combustion engine is adjusted by changing the opening degree of the throttle valve 13a. The throttle body 13b is a cylindrical member in which an intake passage is formed. The throttle body 13b supports the valve shaft 13c for the throttle valve 13a provided in the intake passage. The electric motor 13d changes the opening degree of the throttle valve 13a according to a control executed by the ECU 40. As the electric motor 13d, a step motor is employed. The electric motor 13d is fixed to the throttle body 13b. An output shaft (not shown) of the electric motor 13d is connected to the valve shaft 13c. The ECU 40 detects the opening degree of the throttle valve 13a, based on a signal output from a throttle-valve opening degree sensor (not shown) provided in the electric throttle 13.

As the throttle mechanism, the electric throttle 13 is employed. The electric throttle 13 is a throttle-by-wire throttle mechanism, and the throttle valve 13a is driven by the actuator. Instead of the electric throttle 13, a mechanical throttle mechanism may be employed. In the mechanical throttle mechanism, for example, the opening degree of the throttle valve 13a is changed according to operation of an accelerator pedal (not shown) using a wire or the like. In the intake manifold 14, one intake passage on an upstream side is divided into a plurality of branch intake passages on a downstream side. The branch intake passages on the downstream side correspond to the respective cylinders of the internal combustion engine 50. Thus, the intake manifold 14 distributes intake air into the cylinders of the internal combustion engine 50.

A brake device 20 includes a brake pedal 21; a brake booster (negative pressure operating device) 22, a master cylinder 23, and wheel cylinders (not shown). A driver operates the brake pedal 21 to apply a brake to the rotation of wheels. The brake pedal 21 is connected to an input rod (not shown) of the brake booster 22. The brake booster 22 generates an assist force so that the ratio of the assist force to a pedal depression force is equal to a predetermined ratio. In the brake booster 22, a negative pressure chamber (not shown) close to the master cylinder 23 is connected to the intake passage in the intake manifold 14 through an ejector 30. An output rod (not shown) of the brake booster 22 is connected to an input shaft (not shown) of the master cylinder 23. The master cylinder 23 generates a hydraulic pressure according to an acting force from the brake booster 22 that obtains the assist force in addition to the pedal depression force. The master cylinder 23 is connected to the wheel cylinder provided in a disc brake mechanism (not shown) for each wheel via a hydraulic circuit. The wheel cylinder generates a braking force using the hydraulic pressure supplied to the wheel cylinder from the master cylinder 23. The brake booster 22 is not limited to a specific brake booster, and may be an ordinary brake booster, as long as the brake booster 22 is a pneumatic brake booster.

The ejector 30 generates a negative pressure whose magnitude is larger than that of a negative pressure (i.e., an intake pipe negative pressure) to be taken from the intake system 10, more specifically, the intake manifold 14 downstream of the throttle valve 13a, and supplies the generated negative pressure to the negative pressure chamber of the brake booster 22. The ejector 30 includes an inflow port 31a, an outflow port 31b, and a negative pressure supply port 31c. The negative pressure supply port 31c among the ports is connected to the negative pressure chamber of the brake booster 22 by an air hose 5c. The inflow port 31a is connected to the intake passage in the intake pipe 15a by an air hose 5a at a position upstream of the electric throttle 13, more specifically, the throttle valve 13a. The outflow port 31b is connected to the intake passage in the intake manifold 14 by an air hose 5b at a position downstream of the electric throttle 13, more specifically, the throttle valve 13a. Thus, a bypass passage B that bypasses the electric throttle 13 is formed by the ejector 30 and the air hoses 5a and 5b. When the ejector 30 does not function, the negative pressure is supplied to the negative pressure chamber of the brake booster 22 from the intake passage in the intake manifold 14 through the air hose 5b, the outflow port 31b and the negative pressure supply port 31c of the ejector 30, and the air hose 5c.

The air hose 5a is provided with a VSV (Vacuum Switching Valve) 1. The VSV1 opens/closes the bypass passage B according to a control executed by the ECU 40. In the embodiment, as the VSV1, a normally-closed solenoid valve with two positions and two ports is employed. However, the VSV1 is not limited to this valve. For example, other appropriate electromagnetic valves may be employed as the VSV1. Further, for example, the VSV1 may be a flow rate regulating valve that controls the flow rate of the intake air flowing in a flow passage. The VSV1 makes the ejector 30 function or stop functioning by opening or closing the bypass passage B. In the embodiment, the state change device is implemented by the VSV1.

Figure 2:
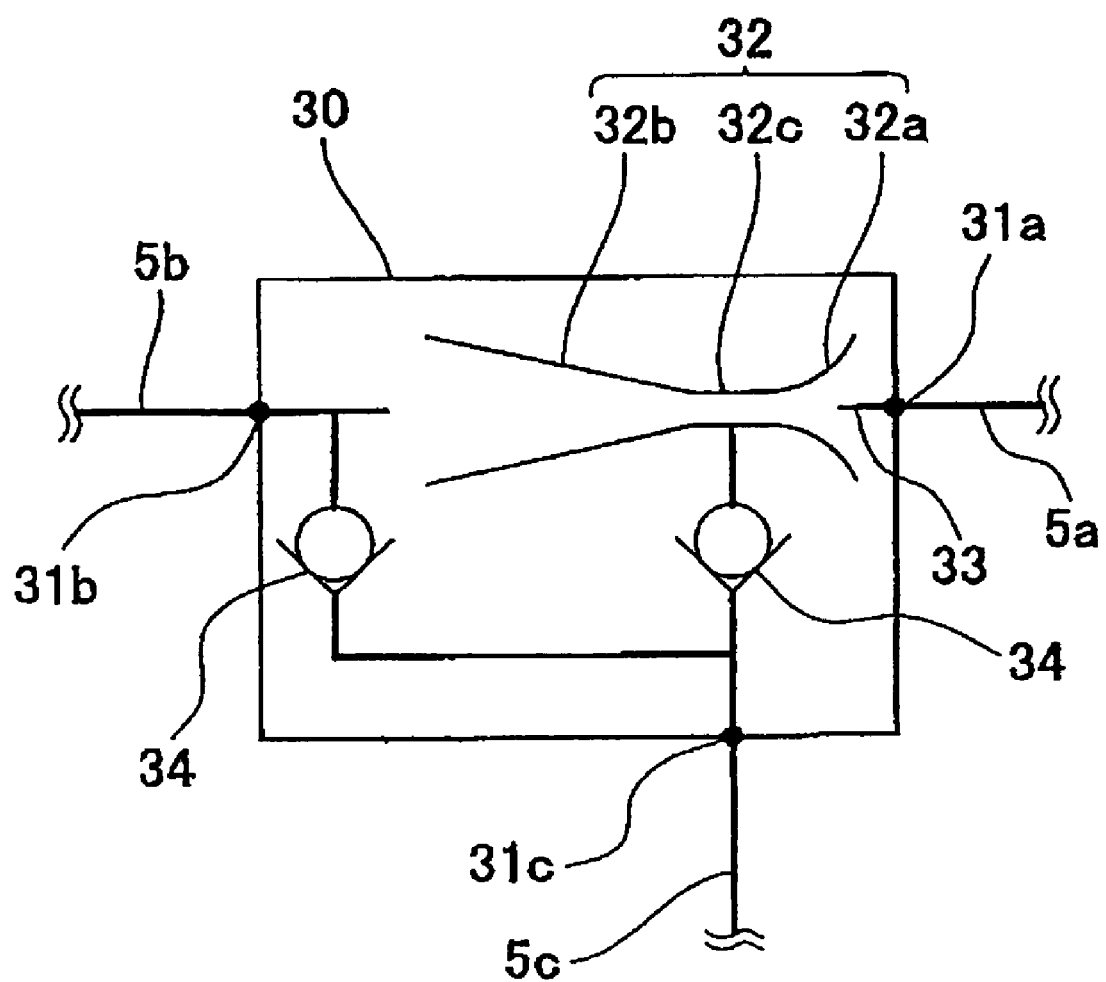
FIG. 2 is a schematic diagram showing the configuration of an inside of an ejector shown in FIG. 1.

FIG. 2 is a schematic diagram showing the configuration of an inside of the ejector 30 shown in FIG. 1. A diffuser 32 is provided inside the ejector 30. The diffuser 32 includes a taper portion 32a, a taper portion 32b, and a negative pressure obtaining portion 32c that serves as a passage connecting the taper portions 32a and 32b. The diameter of the taper portion 32a decreases toward the outflow port 31b, and the diameter of the taper portion 32b increases toward the outflow port 31b. The taper portion 32a is open toward the inflow port 31a. The taper portion 32b is open toward the outflow port 31b. The negative pressure obtaining portion 32c is connected to the negative pressure supply port 31c. The inflow port 31a is provided with a nozzle 33 that injects the intake air, which has flown to the ejector 30, toward the taper portion 32a. The intake air injected from the nozzle 33 flows through the diffuser 32, and flows out from the outflow port 31b to the air hose 5b. At this time, a high-speed jet is generated in the diffuser 32, and accordingly, a great negative pressure is generated in the negative pressure obtaining portion 32c using the venturi effect. Further, the negative pressure is supplied from the negative pressure supply port 31c to the negative pressure chamber through the air hose 5c. Using this function of the ejector 30, it is possible to obtain the negative pressure whose magnitude is larger than that of the negative pressure to be taken from the intake manifold 14.

Check valves 34 are provided in an inner passage between the negative pressure obtaining portion 32c and the negative pressure supply port 31c, in an inner passage between the outflow port 31b and the negative pressure supply port 31c, and in a connection portion of the brake booster 22, to which the air hose 5c is connected. Each of the check valves 32 prevents a backflow. The ejector 30 need not necessarily have the inner structure shown in FIG. 2. Other ejectors that have inner structures different from the inner structure shown in FIG. 2 may be employed, instead of the ejector 30. In the embodiment, a negative pressure generating apparatus 100 includes the VSV1 and the ejector 30. More specifically, the negative pressure generating apparatus 100 includes the air hoses 5a, 5b, and 5c, and the check valves 34.

The ECU 40 includes a microcomputer (not shown) and input/output circuits (not shown). The microcomputer includes a CPU (Central Processing Unit), a ROM (Read Only Memory), and a RAM (Random Access Memory). The ECU 40 mainly controls the internal combustion engine 50. In the embodiment, the ECU 40 also controls the VSV1 and the electric throttle 13. The ECU 40 is connected to the VSV1, the electric throttle 13, and other devices to be controlled by the ECU 40. The ECU 40 is also connected to sensors, such as the throttle-valve opening degree sensor, a vehicle speed sensor 71 that detects a vehicle speed, a coolant temperature sensor 72 that detects the temperature of a coolant for the internal combustion engine 50, a crank angle sensor 73 that detects a rotational speed NE of the internal combustion engine 50.

The ROM stores programs in which processes to be executed by the CPU are described. In the embodiment, the ROM stores, for example, an engine control program used to control the internal combustion engine 50, and a VSV1 control program used to control the VSV1 to make the ejector 30 function or stop functioning (i.e., to open or close the VSV1) according to various conditions. The programs may be integrated with each other. The VSV1 control program includes a negative pressure supply program used to open the VSV1 when the intake pipe negative pressure is a negative value larger than a predetermined value P. Because the intake pipe negative pressure is a negative value, when the intake pipe negative pressure is a negative value larger than the predetermined value P, the absolute value of the intake pipe negative pressure is smaller than the absolute value of the predetermined value P. Further, the negative pressure supply control program is configured to open the VSV1 when the opening degree of the throttle valve 13a is smaller than a predetermined opening degree α.

The VSV1 control program includes a prohibition control program used to prohibit the VSV1 from being opened when the vehicle is transiently decelerated. More specifically, in the embodiment, the prohibition control program is configured to prohibit the VSV1 from being opened according to the negative pressure supply control program, when the vehicle is transiently decelerated. Also, the prohibition control program is configured so that when an amount of change in the intake air amount is a negative value smaller than a predetermined value β, it is determined that the vehicle is transiently decelerated, and the VSV1 is prohibited from being opened. Therefore, The VSV1 control program includes a transient deceleration determination program used to determine whether the vehicle is transiently decelerated. In the embodiment, the transient deceleration determination program is configured to determine whether the change in the intake air amount is a negative value larger than the predetermined value β. In the embodiment, the control device, the detection device, the determination device, and the like are implemented by the microcomputer and the above-described programs. Particularly, the prohibition control device is implemented by the microcomputer and the prohibition control program.

Figure 3:
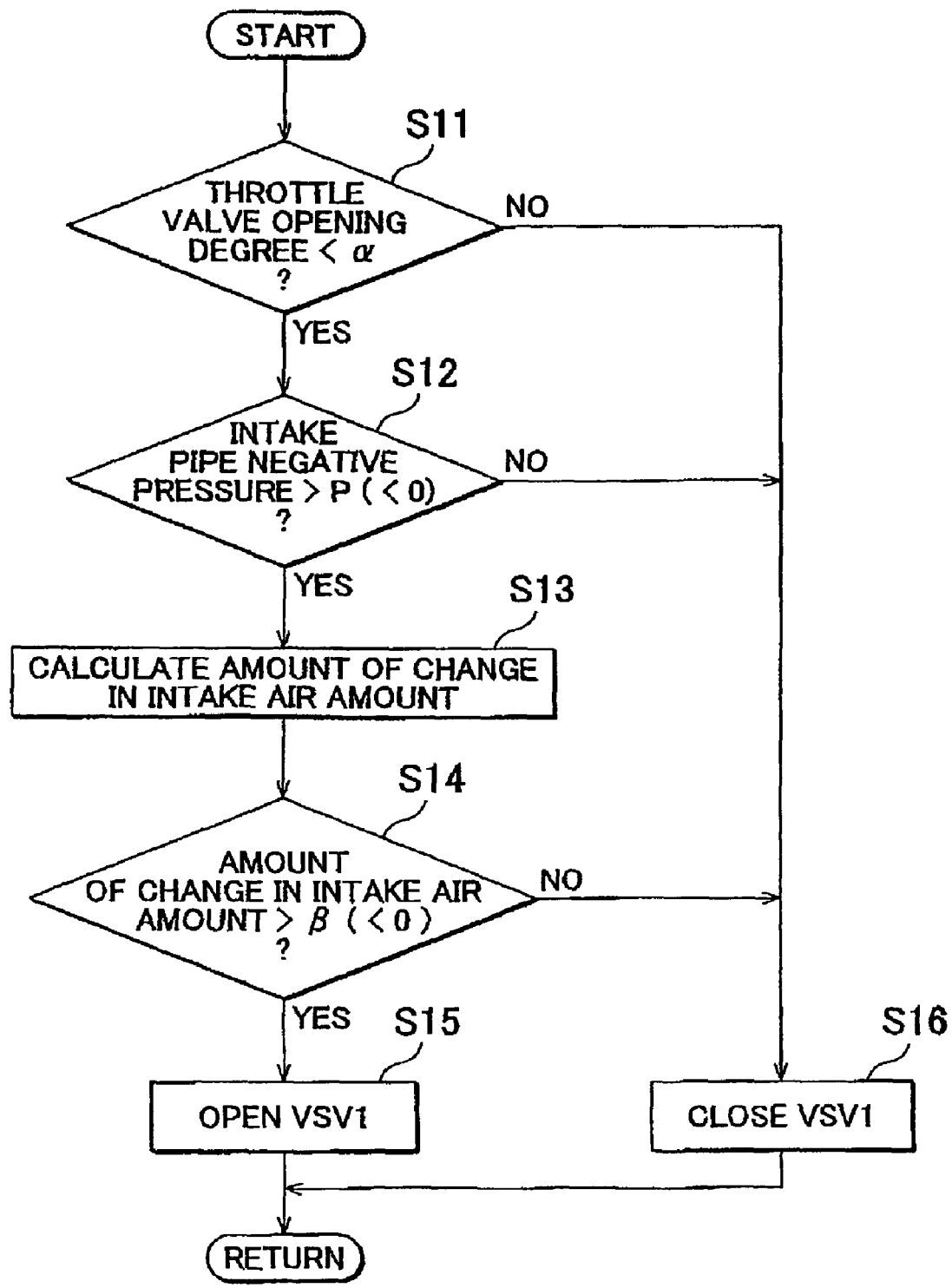
FIG. 3 is a diagram showing a flowchart of a routine executed by the control apparatus for the negative pressure generating apparatus according to the embodiment of the invention.
Figure 4:
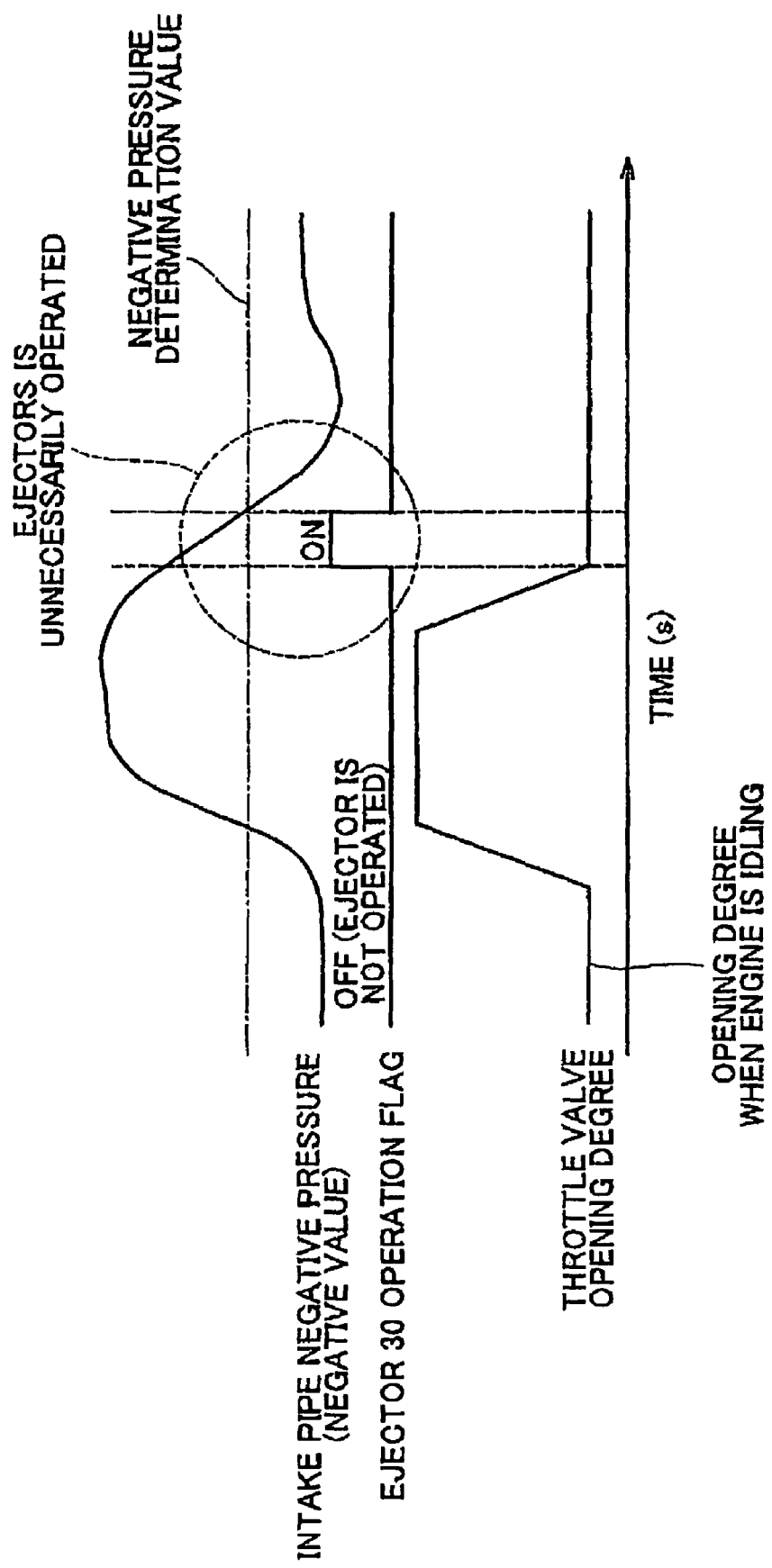
FIG. 4 is a diagram showing an intake pipe negative pressure, operation of an ejector in related art, and an opening degree of a throttle valve when a vehicle travels

Next, a routine executed by the ECU 40 will be described in detail with reference to a flowchart shown in FIG. 3. The CPU repeatedly executes the routine shown by the flowchart, according to the above-described programs stored in the ROM, in extremely short time intervals, and thus, the ECU 40 prohibits the VSV1 from being opened when the vehicle is transiently decelerated. The CPU determines whether the opening degree of the throttle valve 13a is smaller than the predetermined opening degree α (step S11). When a negative determination is made in step S11, the CPU closes the VSV1 (step S16). When an affirmative determination is made in step S11, the CPU determines whether the intake pipe negative pressure is a negative value larger than the predetermined value P (step S12). When a negative determination is made in step S12, the CPU proceeds to step S16.

When an affirmative determination is made in step S12, the CPU calculates the change in the intake air amount (step S13). The change in the intake air amount is calculated by calculating the intake air amount based on the operating state of the internal combustion engine 50 (for example, the rotational speed NE of the internal combustion engine 50 and the opening degree of the throttle valve 13a), detecting the current intake air amount based on the output from the airflow meter 12, and calculating a difference between the calculated intake air amount and the detected intake air amount (equation: the calculated intake air amount—the detected intake air amount). The change in the intake air amount detected by the airflow meter 12 lags behind the change in the opening degree of the throttle valve 13a. Therefore, the above-described difference is a negative value when the vehicle is transiently decelerated.

Then, the CPU determines whether the change in the intake air amount is a negative value larger than the predetermined value β (step S14). The predetermined value β is set to an appropriate value that is obtained through experiment or the like to determine whether the vehicle is transiently decelerated. When an affirmative determination is made in step S14, it is determined that the vehicle is not transiently decelerated. Accordingly, the CPU opens the VSV1 (step S15). Thus, when the magnitude of the intake pipe negative pressure is decreased, it is possible to supply the negative pressure whose magnitude is larger than that of the intake pipe negative pressure, to the brake booster 22 using the ejector 30. When a negative determination is made in step S14, it is determined that the vehicle is transiently decelerated. Accordingly, the CPU closes the VSV1 (step S16). Thus, it is possible to prevent the VSV1 from being unnecessarily opened when the vehicle is transiently decelerated.

The change in the intake air amount need not necessarily be used to determine whether the vehicle is transiently decelerated. For example, a change in the vehicle speed, a change in the rotational speed NE of the internal combustion engine 50, and an elapsed time after the opening degree of the throttle valve 13a becomes smaller than the predetermined opening degree α may be used to determine whether the vehicle is transiently decelerated. When the change in the vehicle speed is used, for example, the vehicle speed is detected at a predetermined time interval; a difference between the vehicle speed detected earlier, and the vehicle speed detected later is calculated (equation: the vehicle speed detected later—the vehicle speed detected earlier); it is determined whether the difference is a negative value smaller than a predetermined value; and when the difference is a negative value smaller than the predetermined value, it is determined that the vehicle is transiently decelerated. When the rotational speed NE of the internal combustion engine 50 is used, the determination is performed in a similar manner.

When the elapsed time after the opening degree of the throttle valve 13a becomes smaller than the predetermined opening degree α, the elapsed time is measured; it is determined whether the measured elapsed time is shorter than a predetermined time; and when the measured elapsed time is shorter than the predetermined time, it is determined that the vehicle is transiently decelerated. Each of the determination processes may be implemented by configuring the transient deceleration determination program so that the above-described determination is performed. In this case, the prohibition control program may be configured to determine that the vehicle is transiently decelerated, when it is determined that the vehicle is transiently decelerated (for example, the difference between the vehicle speed detected earlier and the vehicle speed detected later (i.e., the value obtained by subtracting the vehicle speed detected later from the vehicle speed detected earlier) is a negative value smaller than the predetermined value) according to the transient deceleration determination program. Thus, it is possible to implement the ECU 40 that prevents the ejector 30 from being unnecessarily operated when the vehicle is decelerated.

The above-described embodiments are example embodiments of the invention. However, the invention is not limited to the embodiments. Various modifications may be made to the embodiments within the scope of the invention.

What is claimed is:

1. A control apparatus for a negative pressure generating apparatus, comprising:
    an ejector that generates a negative pressure whose magnitude is larger than that of a negative pressure to be taken from an intake passage in an intake system for an internal combustion engine provided in a vehicle;
    a state change device that makes the ejector function and stop functioning; and
    a prohibition control device that prohibits the state change device from making the ejector function, when the vehicle is in a transiently decelerated state, where a change in an intake pipe negative pressure lags behind a change in an opening degree of a throttle valve, in a control in which the state change device makes the ejector function when the negative pressure to be taken from the intake passage is a negative value larger than a predetermined value, and the opening degree of the throttle valve provided in the intake passage is smaller than a predetermined opening degree, wherein
    the predetermined opening degree is close to, and larger than the opening degree of the throttle valve when the internal combustion engine is idling, and the predetermined opening degree is used to make the ejector function when the internal combustion engine is idling.

2. The control apparatus according to claim 1, wherein when the negative pressure to be taken from the intake passage is a negative value larger than a first predetermined value and the vehicle is in the transiently decelerated state, the prohibition control device prohibits the state change device from making the ejector function.

3. The control apparatus according to claim 1, wherein when an opening degree of a throttle valve provided in the intake passage is smaller than a predetermined opening degree and the vehicle is in the transiently decelerated state, the prohibition control device prohibits the state change device from making the ejector function.

4. The control apparatus according to claim 1, wherein when an amount of change in an amount of intake air flowing in the intake passage is a negative value smaller than a second predetermined value, the prohibition control device determines that the vehicle is in the transiently decelerated state.

5. The control apparatus according to claim 4, further comprising
    an intake air amount detection device that detects the amount of the intake air flowing in the intake passage, wherein the amount of change in the amount of the intake air is calculated based on a difference between the amount of the intake air calculated based on a rotational speed of the internal combustion engine and an opening degree of a throttle valve provided in the intake passage, and the amount of the intake air detected by the intake air amount detection device.

6. The control apparatus according to claim 1, wherein when an amount of change in a vehicle speed of the vehicle is a negative value smaller than a third predetermined value, the prohibition control device determines that the vehicle is in the transiently decelerated state.

7. The control apparatus according to claim 1, wherein when an amount of change in a rotational speed of the internal combustion engine is a negative value smaller than a fourth predetermined value, the prohibition control device determines that the vehicle is in the transiently decelerated state.

8. The control apparatus according to claim 1, wherein when an elapsed time after an opening degree of a throttle valve provided in the intake passage becomes smaller than a predetermined opening degree is shorter than a predetermined time, the prohibition control device determines that the vehicle is in the transiently decelerated state.

9. A control method for a negative pressure generating apparatus that includes an ejector that generates a negative pressure whose magnitude is larger than that of a negative pressure to be taken from an intake passage in an intake system for an internal combustion engine provided in a vehicle; a state change device that makes the ejector function and stop functioning, comprising:

determining whether the vehicle is in a transiently decelerated state, where a change in an intake pipe negative pressure lags behind a change in an opening degree of a throttle valve; and prohibiting the state change device from making the ejector function, when it is determined that the vehicle is in the transiently decelerated state, in a control in which the state change device makes the ejector function when the negative pressure to be taken from the intake passage is a negative value larger than a predetermined value, and the opening degree of the throttle valve provided in the intake passage is smaller than a predetermined opening degree, wherein the predetermined opening degree is close to, and larger than the opening degree of the throttle valve when the internal combustion engine is idling, and the predetermined opening degree is used to make the ejector function when the internal combustion engine is idling.

\* \* \* \* \*